Figure 3:
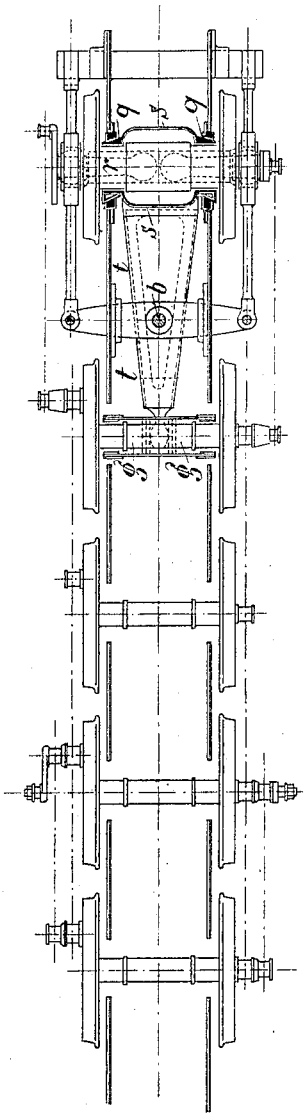

No. 813,379. PATENTED FEB. 20, 1906.
C. HAGANS.
LOCOMOTIVE.
APPLICATION FILED JAN. 30, 1905.
2 SHEETS—SHEET 1.
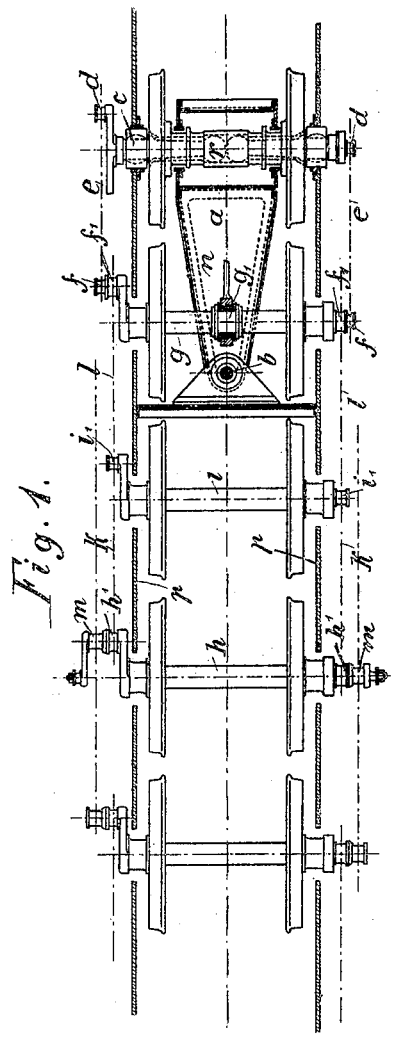
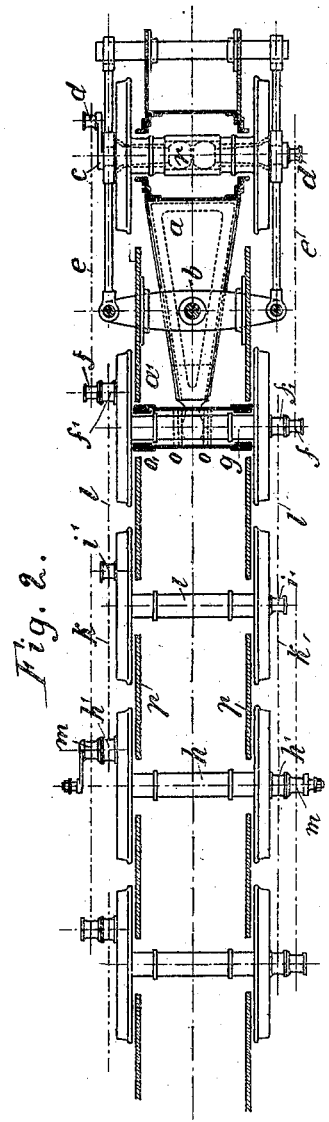
Witnesses,
Inventor
Christian Hagans
By
Atty No. 813,379. PATENTED FEB. 20, 1906.
C. HAGANS.
LOCOMOTIVE.
APPLICATION FILED JAN. 30, 1905.

2 SHEETS—SHEET 2.

Witnesses:

Inventor
Christian Hagans
By
James L. Norris.
Atty.

UNITED STATES PATENT OFFICE.

CHRISTIAN HAGANS, OF ERFURT, GERMANY.

LOCOMOTIVE.

No. 813,379. Specification of Letters Patent. Patented Feb. 20, 1906.

Application filed January 30, 1905. Serial No. 243,383.

*To all whom it may concern:*

Be it known that I, CHRISTIAN HAGANS, manufacturer, a subject of the King of Prussia, German Emperor, residing at Erfurt, in the Kingdom of Prussia and German Empire, have invented certain new and useful Improvements in or Relating to Locomotives, of which the following is a specification.

In locomotives according to my invention the end axle, which is made hollow, is adjusted in the well-known manner by the lateral pressure of the rails and is either supported on a bogie or made into an Adams axle. This end axle when adjusted by the rail-pressure adjusts, by means of the bogie-frame or when forming an Adams axle by means of special rods, a driven or driving locomotive-axle. The latter is supported in the main frame of the locomotive, while the core or inner axle of the hollow end axle effecting the setting of the axle in question is also either supported in the main frame or by a system of rods pivoted to or adjustably mounted, on the one hand, on the main frame and, on the other hand, on the bogie-frame. The connecting of the core-axle to the adjustable axle is effected in the well-known manner either by means of ball-shaped or headed couplings or, when cylindrical pins are used, by means of coupling-rods with joints or bearings replacing said joints.

Two constructions according to my invention are illustrated, by way of example, in the accompanying drawings.

Figures 1, 2, and 3 denote in plan three separate and distinct methods by which the driven or driving locomotive-axle can be adjusted.

In the construction shown in Fig. 1 the movement of the axle, which is supported in the main frame, and that of the bogie take place in the same direction, and in the construction shown in Fig. 2 the movement of the axle takes place in the direction opposite to that of the bogie-frame. The bogie-frame (marked $a$ in both figures) is pivoted to the main frame $p$ at the point $b$. The bogie-frame is guided by the hollow axle or hub $r$. In this hollow axle is arranged the core-axle $c$, supported in the main frame, with its coupling-pins $d$ driven from the coupling-pins $f$ of a coupled or driving axle $g$ by means of coupling-rods $e$. The axle $g$, if it be a coupled axle, as in the constructions illustrated, is either driven direct from a driving-axle $h$ or through a coupling-axle $i$ by means of coupling-pins $h'$ $h'$ and coupling-rods $k$, acting on the pins $f'$ of the axle $g$ through coupling-rods $l$. In the latter case $m$ $m$ are the cranks driven from the cylinder.

The end axle, constituted by the hollow axle $r$ and the core-axle $c$, moves the axle $g$ laterally by means of the bogie-frame $a$. The core-axles $c$ are either not movable laterally or only movable in rectilinear direction to a very small extent or are laterally movable, in case of large bends, in a circle having a radius equal to the length of the coupling-rods.

The movement of the coupling or driving axles $g$ is in most cases so small that the clearance in the axle-bearings and coupling-pin bearings of the coupling-rods $k$ and $l$ is sufficient to equalize the length alterations of the coupling-rods $l$ produced by small lateral deviations of the axle $g$. In the event of large deviations of the axles the coupling can be effected in a different manner, as indicated at the beginning of the specification.

In the construction shown in Fig. 1 the axle $g$, coupled to the coupling-axle $c$ of the bogie $a$, is arranged in the main frame between the axle $c$ and the pivot $b$ of the bogie. It is provided with neck-bearings $g'$, inclosed by a bearing $n$ on the bogie $a$. The deviation of the bogie $a$ is transmitted by the bearing $n$ to the axle $g$. This bearing $n$, which is secured to the bottom plate of the bogie frame $a$, incloses the bearing-collars $g'$ of the axle $g$. Upon lateral shifting of the bogie-frame $a$ during traveling on curves by the axle $r$ the axle $g$, which has lateral play in its bearing in the main frame $p$, will be moved laterally by the bearing $n$ engaging between the bearing-collars $g'$ without any lateral play, the said movement taking place in the same direction as the axle $r$, since both axles $r$ and $g$ are arranged in Fig. 1 in front of the pivot $b$ of the bogie-frame, so that the bogie-frame $a$ forms, to a certain extent, a one-armed lever which is shifted laterally by the axle $r$, and consequently it moves at the same time the axle $g$, by means of the bearing $n$ and the bearing-collars $g'$, in the same direction. The movement of the axle $g$ takes place, therefore, in the construction shown in Fig. 1 in the same direction in which the bogie is turned.

In the construction shown in Fig. 2 the bogie is extended beyond its pivot $b$ and carries a claw or head $a'$, engaging between collars or projections $o$ in the axle-bar $o'$ of the axle $g$, coupled to the axle $c$. When the bogie $a$ turns, the axle $g$ is therefore moved laterally about the pivot $b$, but in the opposite direction to the bogie. The pivot point or pin $b$ is fixed in a bridge secured to the main frame $p$. About this pivot $b$ rotates the bogie-frame $a$ when it is deviated laterally by the axle $r$ during traveling on curves. As the pivot-pin $b$ of the bogie-frame $a$ in Fig. 2 is situated between the axles $r$ and $g$, the bogie-frame $a$ forms, so to say, a double-armed lever, and the end of the bogie-frame connected to the axle $g$ moves during the lateral deviations of the bogie-frame $a$ by the axle $r$ in the opposite direction to that of the end of the bogie-frame $a$ connected to the axle $r$. In the construction shown in Fig. 2 the frame marked $p$ in Fig. 1 is replaced in the well-known manner by a system of rods pivoted at one side to the main frame and guided, on the other hand, in a cross-bar in the bogie for the purpose of supporting the core-axle $c$.

Instead of the bogie-frame $a$ Adams axles or hollow axles $r$, mounted like Adams axles, could be used, as shown in Fig. 3. Adams axles are axles provided with Adams axle-boxes $q$, the circular silding surfaces of which effect the lateral setting of the axle $r$. If a rod $t$ is secured to the connection parts $s$ of these Adams bearings, the said rod pivoting about a point $b$ like the bogie-frame $a$ in Figs. 1 and 2 and connected, as in these two figures, to the axle $g$, the Adams mounting of the axle $r$ and the rod $t$ will produce the same setting of the axles $r$ and $g$ as in Figs. 1 and 2.

Having now particularly described and ascertained the nature of my said invention and in what manner the same is to be performed, I declare that what I claim is—

Means for laterally adjusting a driving or driven locomotive-axle, comprising the combination with said axle, of a laterally-adjustable hollow end axle, a core-axle for said hollow axle, and means for transferring the movement of said hollow end axle to the driving or driven locomotive-axle and for driving the said core-axle.

In testimony whereof I have hereunto set my hand in presence of two subscribing witnesses.

CHRISTIAN HAGANS.

Witnesses:
WILHELM MONDSCHEIN,
AFR. AUGUST FRANKE.